Oct. 1, 1957    M. F. PETERS    2,808,354
ELECTRIC CABLES AND THE METHOD OF MAKING THE SAME
Original Filed Nov. 22, 1950

INVENTOR
MELVILLE F. PETERS

BY R. J. Tompkins
ATTORNEYS

United States Patent Office 2,808,354
Patented Oct. 1, 1957

2,808,354

ELECTRIC CABLES AND THE METHOD OF MAKING THE SAME

Melville F. Peters, Livingston, N. J.

Original application November 22, 1950, Serial No. 197,060. Divided and this application January 5, 1956, Serial No. 557,556

4 Claims. (Cl. 154—2.25)

The present invention relates to electrical cables and methods of making the same.

This application is a division of copending application Serial No. 197,060, filed November 22, 1950, for Electric Cables and the Method of Making the Same.

In concentric cables of the type which comprise an inner conductor, usually insulated, surrounded by an outer protective shield, there are many advantages to filling the space between the inner conductor and the outer shield with a suitable material. Among these advantages are, for example, reduction of corona and prevention or reduction of water condensation. When such cables are subjected to vibration, other advantages include prevention of chafing between the inner conductor and the shield and damping of stress waves in the shield. For some uses of such cables it is desirable to employ a filling material, for example, silicon, useful over a wide range of temperatures. However, over extreme temperature ranges otherwise suitable materials undergo a change in volume sufficient to burst the protective shield or to cause the material to extrude from the ends of the cable.

The present invention overcomes these disadvantages by filling the space between the inner conductor and the protective shield in such manner that voids exist in the filling material at temperatures below the maximum usable temperature, these voids being filled by the expanded material at temperatures near the maximum usable temperature. Accordingly, it is an object of this invention to provide a method and means for constructing a cable so that the cable is unaffected by elevated temperatures.

It is another and more specific object of this invention to provide a method and means of constructing a concentric cable so that, at temperatures below a maximum usable temperature, voids exist between the inner conductor and the outer shield.

Other objects and many of the attendant advantages of the present invention will be readily appreciated as the same becomes better understood by reference to the following detailed description when considered in connection with the accompanying drawings wherein.

Figure 1:
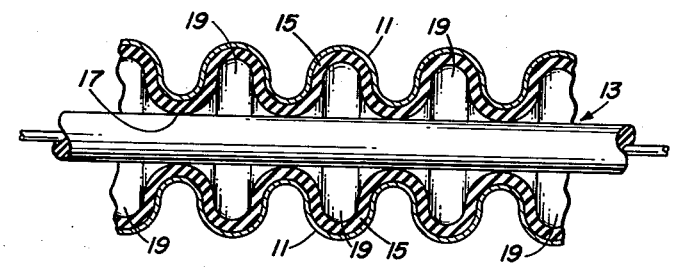
Fig. 1 is a longitudinal section of a cable constructed according to the invention.
Figure 2:
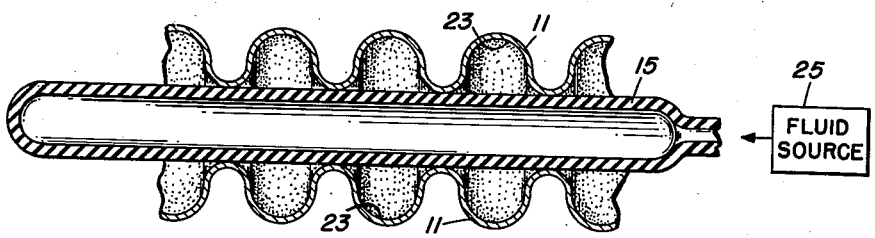
Fig. 2 is a view similar to Fig. 1 showing the cable of Fig. 1 in the process of construction.
Figure 3:
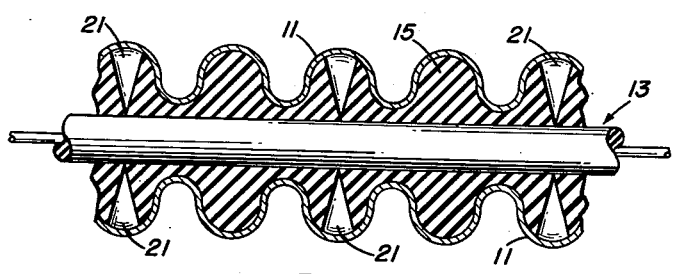
Fig. 3 is a longitudinal section of another cable constructed according to the invention.

Referring now to the drawings in which like reference numerals designate like or corresponding parts throughout the several views there is shown in Figs. 1 and 2 cable constructions which are the subject matter of the above referred to copending application Serial No. 197,060 and are described in detail therein. The following brief description is given in order to facilitate an understanding of the present invention. Referring to Fig. 1 there is shown the components of a cable in their relative positions at or about the minimum temperature of the useful temperature range. The cable comprises a flexible metal shield 11, an inner conductor 13, insulated in the example shown, and an insulating or dielectric material 15 adhered to and preferably completely covering the entire inner surface of shield 11. The inner conductor 13 has been drawn through the shield 11 and material 15 so that conductor 13 is in contact with material 15 at points 17 and is centrally supported thereby. At elevated temperatures material 15 expands into and fills voids 19. Fig. 3 shows a cable construction similar to that shown in Fig. 1 except that insulating or dielectric material 15 almost completely fills the space between conductor 13 and shield 11, there being a plurality of V-shaped voids 21 in the material 15. If the cable is short only two voids, one at each end, may be needed.

Referring now to Fig. 2, there is shown one method of constructing the cable shown in Fig. 1. The inner surface of shield 11 is initially cleaned and coated with an adhesive 23. A tube of material 15 is inserted into shield 11, as shown in Fig. 2, one end of the tube of material 15 being initially closed as by forming the tube in the shape shown or by the insertion of a plug. A fluid, such as air or steam, is introduced under pressure from a fluid source 25 into the other end of the tube of material 15 until material 15 is forced into intimate contact with the convolutions of shield 11. Material 15 may be cured after being forced into the convolutions of shield 11 or partially or completely cured prior thereto. Conductor 13 is then inserted to complete the cable.

It may be desirable to evacuate shield 11 prior to introducing fluid pressure into the tube of material 15 in order to insure close and even adherence between material 15 and shield 11. Care should be taken in the choice of material 15 and the fluid medium so as to avoid unfavorable physical or chemical reaction therebetween.

In another method according to the invention, material 15 may be moulded or otherwise formed initially into a suitable shape, conductor 13 inserted, and shield 11 wrapped about conductor 13 and material 15. These operations may be performed at or near the minimum usable temperature of the cable.

Another method of cable construction according to the present invention is to force material 15 between conductor 13 and shield 11 while the elements are held at an elevated temperature, preferably at or near the maximum usable temperature of the cable. Subsequent cooling will produce voids in material 15 of sufficient volume to accommodate any future expansion of the material 15 and the conductor insulation if conductor 13 is insulated.

In still another method according to the invention, material 15 may be extruded into the space between conductor 13 and shield 11 while the elements are maintained at or near the minimum usable temperature of the cable, the space between conductor 13 and shield 11 having been priorly partially filled by the insertion of removable plugs. The plugs may be made removable by making them deflatable, and removing them after material 15 has adhered to shield 11 by first removing conductor 13.

These latter two methods will produce a cable similar in appearance to that shown in Fig. 3.

While the methods of cable construction, according to the invention, have been described in connection with a concentric cable having an inner conductor and an outer flexible shield, it is obvious that the methods according to the invention can be employed in the construction of other types of cables, for example, coaxial cables having a rigid outer conductor and a plurality of inner conductors. It should be understood that the foregoing disclosure relates to only preferred embodiments of the invention and that numerous modifications or alterations may be made therein without departing from the spirit and the scope of the invention as set forth in the appended claims.

What is claimed is:

1. A method of making a filled electric cable which includes an inner conductor, an outer flexible convoluted shield and an expansible insulating sheath between said conductor and said shield, said method comprising the steps of cleaning the inner surface of said shield, coating said inner surface with an adhesive material, drawing said sheath into said shield, introducing fluid under pressure into said sheath to expand said sheath until the outer surface thereof rests against the inner surface of said shield, and drawing said conductor into said sheath.

2. The method of claim 1, and maintaining said sheath at an elevated temperature during the period of drawing said conductor into said sheath.

3. The method of claim 1, wherein said shield is evacuated and wherein said sheath is expanded until the inner surface thereof is contiguous to the area to be occupied by the outer surface of said conductor at spaced points therealong.

4. A method of making a filled electric cable which includes an inner conductor, an outer flexible convoluted shield and an expansible insulating sheath between said conductor and said shield, said method comprising the steps of coating the inner surface of said shield with an adhesive material, drawing said sheath into said shield, expanding said sheath until the outer surface thereof is contiguous with the inner surface of said shield and the innermost portions of the inner surface thereof are contiguous to the area to be occupied by the outer surface of said ocnductor, and drawing said conductor into said sheath.

References Cited in the file of this patent
UNITED STATES PATENTS

| | | |
|---|---|---|
| 378,776 | Dittenhoefer | Feb. 28, 1888 |
| 1,324,850 | Roberts | Dec. 16, 1919 |

FOREIGN PATENTS

| | | |
|---|---|---|
| 693,093 | Germany | July 2, 1940 |